US007444305B2

(12) United States Patent
Cotten et al.

(10) Patent No.: US 7,444,305 B2
(45) Date of Patent: Oct. 28, 2008

(54) METHODS OF COORDINATING PRODUCTS AND SERVICE DEMONSTRATIONS

(75) Inventors: Sandra Cotten, Huntington Beach, CA (US); Caroline Nakken, Whittier, CA (US)

(73) Assignee: Mass Connections, Inc., Cerritos, CA (US)

( * ) Notice: Subject to any disclaimer, the term of this patent is extended or adjusted under 35 U.S.C. 154(b) by 1089 days.

(21) Appl. No.: 10/013,826

(22) Filed: Dec. 7, 2001

(65) Prior Publication Data

US 2003/0229583 A1 Dec. 11, 2003

Related U.S. Application Data

(60) Provisional application No. 60/269,047, filed on Feb. 15, 2001, provisional application No. 60/305,805, filed on Jul. 16, 2001, provisional application No. 60/336,340, filed on Oct. 18, 2001.

(51) Int. Cl.
*G06Q 40/00* (2006.01)

(52) U.S. Cl. .......................................... 705/41; 705/44

(58) Field of Classification Search .................. 705/9, 705/11, 32, 41; 235/377
See application file for complete search history.

(56) References Cited

U.S. PATENT DOCUMENTS

| | | | | |
|---|---|---|---|---|
| 4,654,793 A | 3/1987 | Elrod | .......................... | 364/401 |
| 4,723,212 A | 2/1988 | Mindrum et al. | | |
| 5,025,372 A | 6/1991 | Burton et al. | | |
| 5,056,019 A | 10/1991 | Schultz et al. | | |
| 5,255,182 A | 10/1993 | Adams | ......................... | 364/405 |
| 5,255,183 A | 10/1993 | Katz | ............................ | 364/406 |
| 5,397,881 A | 3/1995 | Mannik | ....................... | 235/380 |
| 5,500,513 A | 3/1996 | Langhans et al. | | |
| 5,508,977 A | 4/1996 | Tymn | ........................... | 368/10 |
| 5,550,359 A * | 8/1996 | Bennett | ...................... | 235/382 |
| 5,592,376 A | 1/1997 | Hodroff | ....................... | 395/214 |
| 5,646,839 A | 7/1997 | Katz | ........................ | 379/93.01 |
| 5,649,114 A | 7/1997 | Deaton et al. | | |
| 5,649,118 A | 7/1997 | Carlisle et al. | .............. | 395/241 |
| 5,687,323 A | 11/1997 | Hodroff | ....................... | 395/230 |
| 5,717,867 A * | 2/1998 | Wynn et al. | .................... | 705/32 |
| 5,748,908 A | 5/1998 | Yu | ............................... | 395/244 |
| 5,749,075 A | 5/1998 | Toader et al. | | |

(Continued)

OTHER PUBLICATIONS

"The good, the bad and the ugly of p-cards," Ellen Mesmer, Network World, Framingham: Aug. 23, 1999. vol. 16, Iss. 34; p. 42, 1 pgs.*

(Continued)

*Primary Examiner*—Jagdish N Patel
*Assistant Examiner*—Sara Chandler
(74) *Attorney, Agent, or Firm*—Knobbe, Martens, Olson, & Bear, LLP

(57) ABSTRACT

This invention relates to the methods of coordinating product and service demonstrations. An event coordinator directs event operators to conduct a product or service demonstration event. The event coordinator provides event operators with cards, such as debit cards, credit cards, or smart cards, to purchase items needed for the demonstration. The event operator contacts a card administration system to activate the card. The card administration system verifies that the provided card ID and event ID are valid, and associates an authorized budget of the demonstration event with the card. The event operator then purchases items with the card, and conducts demonstrations.

10 Claims, 10 Drawing Sheets

U.S. PATENT DOCUMENTS

| | | | | |
|---|---|---|---|---|
| 5,798,508 | A | 8/1998 | Walker et al. | 235/380 |
| 5,893,080 | A | 4/1999 | McGurl et al. | 705/40 |
| 5,903,633 | A | 5/1999 | Lorsch | |
| 6,032,134 | A | 2/2000 | Weissman | 705/40 |
| 6,038,547 | A | 3/2000 | Casto | 705/30 |
| 6,052,675 | A | 4/2000 | Checchio | 705/44 |
| 6,078,891 | A | 6/2000 | Riordan et al. | 705/10 |
| 6,185,545 | B1 | 2/2001 | Resnick et al. | 705/40 |
| 6,422,463 | B1* | 7/2002 | Flink | 235/382 |
| 6,502,745 | B1 | 1/2003 | Stimson et al. | |
| 6,751,650 | B1* | 6/2004 | Finch et al. | 709/203 |
| 6,829,596 | B1 | 12/2004 | Frazee | |
| 7,024,395 | B1* | 4/2006 | McCown et al. | 705/65 |
| 2002/0046341 | A1 | 4/2002 | Frazee | |
| 2002/0156725 | A1 | 10/2002 | Harara | |
| 2002/0169720 | A1* | 11/2002 | Wilson et al. | 705/44 |
| 2002/0169747 | A1 | 11/2002 | Chapman et al. | |
| 2003/0046249 | A1* | 3/2003 | Wu | 705/79 |
| 2003/0050043 | A1 | 3/2003 | Ohrstrom et al. | |
| 2003/0055755 | A1* | 3/2003 | Shuder et al. | 705/32 |
| 2003/0061163 | A1* | 3/2003 | Durfield | 705/44 |
| 2003/0074287 | A1* | 4/2003 | Shuder et al. | 705/32 |
| 2003/0229583 | A1 | 12/2003 | Cotten et al. | |
| 2004/0139318 | A1 | 7/2004 | Fiala et al. | |
| 2004/0205023 | A1 | 10/2004 | Hafer et al. | |
| 2005/0209014 | A1* | 9/2005 | Kim | 473/157 |
| 2006/0010023 | A1 | 1/2006 | Tromczynski et al. | |

OTHER PUBLICATIONS

"Energizing the purchasing card," Charles Marc Abbey. Credit Card Management. New York: Apr. 1998. vol. 11, ISs. 1; p. 40, 3 pgs.*

"New generation plastic cards programs," Suzanne N Colpitts. The Armed Forces Comptroller. Alexandria: Summer 1998. vol. 43, Iss. 3; p. 29, 2 pgs.*

"Put it on my card, please", Klaus Hintz. CMA. Hamilton: Apr. 1998. vol. 72, Iss. 3; p. 18, 3 pgs.*

"The Complete Idiot's Guide to Meeting and Event Planning", Robin E. Craven and Lynn Johnson Golabowski. Alpha Books: 2001.*

* cited by examiner

EVENT MANAGMENT ─ 902

| EVENT ID | EVENT STATUS | EVENT STARTING DATE | EVENT ENDING DATE | AUTHORIZED BUDGET | AGENCY ID | CARD NUMBERS |
|---|---|---|---|---|---|---|
| E001 | CLOSED | 01/01/2001 | 01/01/2001 | $20 | JIM'S AGENCY | 111111111 |
| E002 | OPEN | 06/30/2001 | 07/04/2001 | $50 | JOE'SGENCY | 222222222 |
| E003 | OPEN | 07/01/2001 | 07/01/2001 | $35 | TIM'S AGENCY | 123456789,234567890 |
| E004 | CLOSED | 09/01/2001 | 09/02/2001 | $100 | LEE'S AGENCY | 777777777,88888888..... |

TODAY'S DATE: 07/01/2001

*FIG. 9*

CARD MANAGEMENT 1002

| CARD ID | PIN NUMBER | CARD STATUS | BALANCE | AGENCY ID | EVENT ID |
|---|---|---|---|---|---|
| 123456789 | 6789 | BLOCKED | 0 | TIM'S AGENCY | E003 |
| 111111111 | 1111 | DEACTIVATED | 0 | JIM'S AGENCY | E001 |
| 222222222 | 2222 | ACTIVATED | $50 | JOE'S AGENCY | E002 |
| 333333333 | 3333 | ACTIVATED | $25 | JOE'S AGENCY | E002 |

FIG. 10

METHODS OF COORDINATING PRODUCTS AND SERVICE DEMONSTRATIONS

RELATED APPLICATIONS

This application claims priority under 35 U.S.C. 119(e) from U.S. Provisional Application No. 60/269,047, filed Feb. 15, 2001, and titled "System for Coordinating Product Demonstrations and Merchandising Ventures," from U.S. Provisional Application No. 60/305,805, filed Jul. 16, 2001, and titled "Methods of Coordinating Product Demonstrations," and from U.S. Provisional Application No. 60/336,340, filed Oct. 18, 2001, and titled "Methods of Coordinating Product and Service Demonstrations," which are hereby incorporated by reference.

BACKGROUND OF THE INVENTION

1. Field of the Invention

The invention relates generally to the methods for remotely managing financial expenditures by employees, and more particularly to the methods for coordinating product and service demonstrations.

2. Description of the Related Art

A number of companies such as product manufacturers and product distributors use event coordinators to coordinate product demonstrations in public areas such as retail stores. In a typical scenario, the event coordinator directs event operators to buy the demonstration products from retail stores and distribute or demonstrate the products within the retail stores on a given date for a given time duration. The manufacturer or the event coordinator may specify the location and time of the demonstration event. For example, a cooking utensil manufacturer asks an event coordinator to coordinate an event demonstrating its cooking utensils. The event coordinator then directs event operators to go to a retail store, purchase the cooking utensils, purchase food, and present a food preparation demonstration in the retail store with the purchased cooking utensils and food. Typically the event operator sets up a booth with promotional items and advertisements, so that the event operator can introduce and promote the products. Often the event operator distributes products to customers of the retail store at a reduced price or free of charge.

The event operator is usually an employee of an agency contracted by the event coordinator. In another embodiment, the event operator is an employee of the event coordinator. The term "employee" is used in the present application to include independent contractors. In typical situations, the event coordinator will utilize an agency's event operators, because the event coordinator does not have its own employees physically located in the geographical locale in which the products are to be demonstrated. The event operators are provided funds, typically in the form of cash or checks, for buying the demonstration products. The event coordinator must rely on the trustworthiness of agencies to direct employees to the demonstration locations. The event coordinator must also rely on the trustworthiness of the event operators to use the provided funds to purchase the demonstration products, instead of using the funds for their personal purposes. The event coordinator must further rely on the trustworthiness of the event operators to work in the specified demonstration location on the specified date for the specified time period.

The event operators need to be provided funds to purchase necessary items in order to conduct the demonstration event. Credit cards can be used to make purchases without the use of cash. However, many conventional credit cards do not deduct the purchase amount from a sum of money held by the consumers. Rather, credit cards in effect provide a loan to the consumer to be paid back at a later time. If credit cards are provided to the event operators to make required purchases, the event coordinator cannot control the amount and nature of purchases. Debit cards allow a consumer to make a purchase for products without the use of cash by directly deducting the purchase amount from the consumer's bank account. Debit cards also provide a similar advantage to credit cards in that a record of purchases can be tracked according to usage of the card. With cash purchases, only the consumer can keep track of the purchases by collecting receipts.

SUMMARY OF THE INVENTION

One aspect of the invention relates to a method of coordinating product or service demonstrations. The method includes the acts of receiving a request from a vendor to organize a demonstration event, defining the demonstration event in a card administration system, providing cards to event operators, instructing the event operators to activate the cards by contacting the card administration system, instructing the event operators to use the activated cards to purchase items for conducting the event, and instructing the event operators to use the purchased items to conduct the event. A card can be a debit card, a smart card, a credit card, a hybrid debit-credit card that allows a user to spend a percentage of deposited money and use the deposit as security, and the like. The event can be a product demonstration event to display, promote, or distribute products. The event can also be a service demonstration event to introduce or promote services. Examples of services may include travel agency services, financial services, and other services. A vendor is typically an entity that provides the demonstrated products or services.

Another aspect of the invention relates to a method of conducting a product or service demonstration event. The method includes the acts of receiving an instruction for conducting a demonstration event, receiving a card, activating the card by contacting a card administration system, using the card to purchase items for conducting the demonstration event, and using the purchased items to conduct the demonstration event.

Still another aspect of the invention relates to a method of facilitating a product or service demonstration event. The method includes the acts of receiving instructions from an event coordinator to conduct the demonstration event, receiving cards from the event coordinator, assigning cards to event operators, directing event operators to activate the assigned cards by contacting a card administration system, directing event operators to use the activated cards to purchase items for conducting the demonstration event, directing event operators to use the purchased items to conduct the demonstration event, and compensating event operators for conducting the demonstration event.

Yet another aspect of the invention relates to a method of providing cards for conducting product or service demonstrations. The method includes the acts of issuing cards and creating records for the issued cards. Each of the created card records includes a card identifier of the card and a balance of the card. The method further includes the act of creating records for demonstration events. Each of the created event records includes an event identifier of the event and an authorized budget of the event. The method further includes receiving activation requests, wherein each of the activation requests provides at least a card identifier of a requesting card and an event identifier of a requesting event. The method further includes the acts of incrementing the balance of the requesting card by the authorized budget of the requesting event and authorizing a retail request to use one of the cards to purchase items, if the total purchase amount does not exceed the balance of the card.

BRIEF DESCRIPTION OF THE DRAWINGS

FIG. 9 illustrates one embodiment of a computer screen for maintaining event records in a card administration system.

FIG. 10 illustrates one embodiment of a computer screen for maintaining card records in a card administration system.

DETAILED DESCRIPTION OF THE PREFERRED EMBODIMENT

Figure 1:
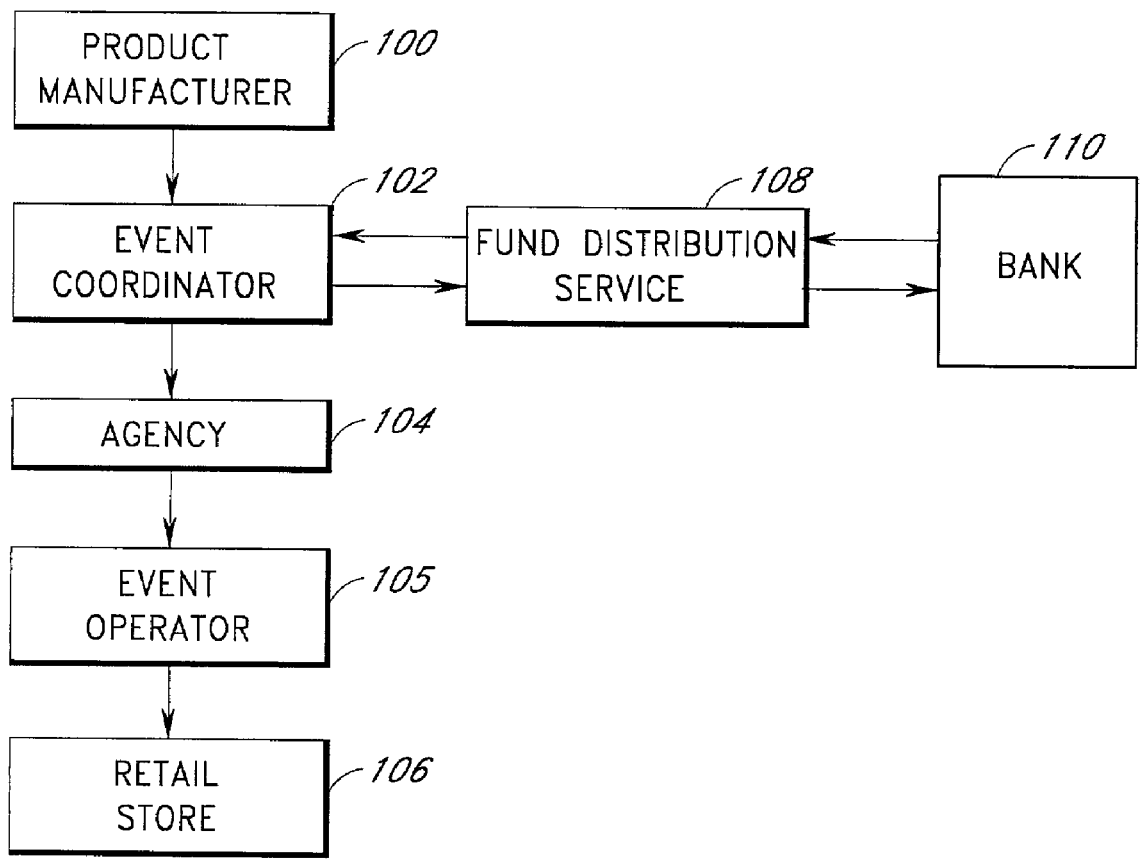
FIG. 1 is a block diagram illustrating the relationships between the entities involved in coordinating product and service demonstrations.

FIG. 1 is a block diagram that illustrates the relationships between entities involved in coordinating product and service demonstrations. The entities include a product manufacturer 100, an event coordinator 102, an agency 104, an event operator 105, a retail store 106, a fund distribution service 108, and a bank 110. The product manufacturer 100 can also be a service vendor that provides services. A service vendor can be, for example, a travel agency, a transportation company, a financial brokerage firm, a real estate agency, an Internet service provider, and the like.

Optionally, the bank 110 can include a collection of banks and/or other financial institutions (e.g., a credit card service that issues debits cards). Optionally, the product manufacturer 100, the event coordinator 102, the agency 104, the event operator 105, the fund distribution service 108, and the bank 110, can exist as one entity or a plurality of entities. For example, employees of the product manufacturer 100 can provide the services of the event coordinator 102, the agency 104 and the event operators 105. For another example, the event coordinator 102 can include the fund distribution service 108 and the bank 110 as its own internal financial service facilities.

In one embodiment, the product manufacturer 100 contacts the event coordinator 102 to request a demonstration of a particular product. A service vendor can also contact the event coordinator 102 to request a demonstration of a particular service. The event coordinator 102 directs its own employees or employees from the agency 104 to work as event operators 105 at the retail store 106. In particular, the event operators 105 are directed by the event coordinator 102 or the agency 104 to demonstrate a given product at a given demonstration location on a given date. The event coordinator 102 orders a supply of cards 702 (see FIG. 7) from the fund distribution service 108 to be used by the event operators 105 for purchasing the items necessary for the demonstration. In one embodiment, the event coordinator 102 provides funds to the bank 110 to be held in trust for the fund distribution service 108. The funds cover the total authorized budget for the demonstration events. For an event operator 105 using a given card 702, the authorized budget is the amount sufficient for purchasing one or more of the items to be demonstrated. The authorized budget is also sufficient for purchasing ancillary items in order to conduct the demonstration. For example, the authorized budget for demonstrating a food product may include funds to purchase the food product and funds to purchase paper plates, forks, and the like, for demonstrating the food product. In another example, the authorized budget for the demonstration of a travel agency service includes the funds to purchase items such as pens and paper to prepare for visual presentation of the service to customers of the retail store. The budget may also include funds to purchase other items such as food and souvenirs to be given to customers of the retail store.

In another embodiment, the fund distribution service 108 later bills the event coordinator 102 for the amount purchased on the cards 702. The cards 702 assist the event coordinator 102 or the agency 104 in verifying that the event operators 105 made the specified purchases for the demonstration. The cards 702 also help verify that the event operators 105 conducted the events at the date, time and location specified by the event coordinator 102 or the agency 104.

The fund distribution service 108 provides the event coordinator 102 with cards 702 that include respective card ID information. In one embodiment, each card 702 is also associated with a respective PIN number that identifies the card 702. Companies such as GE Capital, American Express, or Comdata Corporation can be used as the fund distribution service 108. The event coordinator 102 can also create its own fund distribution service 108. The card 702 can be a debit card, a credit card, a smart card, or another type of computer accessible storage medium. A credit card typically stores information on a magnetic strip of the credit card. A smart card typically stores information in a microchip of the smart card. Information can also be stored on other computer accessible storage medium such as floppy disks or optical disks. For convenience, all of the various embodiments are referred to in the present application as cards 702.

In one embodiment described below, the event coordinator 102, the fund distribution service 108, or both entities can use a card administration system to automate the card administration process. The fund distribution service 108 provides the cards 702 to the event coordinator 102, the agency 104, or the event operator 105. A balance is associated with each individual card 702. The card 702 can be deactivated after the demonstration is completed.

In one embodiment, the event coordinator 102 uses the card administration system to maintain records for the cards 702 and records for the demonstration events. The event coordinator 102 typically assigns multiple cards 702 to each agency 104. The event coordinator 102 can also change the PIN numbers of the cards 702 assigned to the agency 104. In one embodiment, some or all of the cards 702 assigned to an agency 104 share the same PIN number, therefore reducing the number of PIN numbers that the agency 104 needs to maintain.

Prior to starting the demonstration, the event operator 105 activates the card 702 he or she will be using by contacting a card administration system. The event operator 105 contacts the card administration system using an automated device through a communication medium such as a telephone line or a computer network. The automated device can be a Voice Recognition Unit (VRU) that accepts input by voice recognition, or a device that accepts input from the keypad of a telephone (including a cellular phone), from the keyboard of a computer or personal digital assistant, or from other wired or wireless electronic devices. The event operator 105 provides the automated device with a card ID and an event ID. After receiving the card ID and the event ID, the card administration system authorizes the card 702 with the provided card ID to be used for the event with the provided event ID. The card administration system associates the card 702 with the event's authorized budget. In another embodiment, the event coordinator 102 or the agency 104 contacts the card administration system directly or through the automated device to activate the cards 702 that will be used by event operators 105. The card administration system can be administered by the event coordinator 102, the fund distribution service 108, or a third party.

The event operator 105 uses the authorized card 702 to purchase items at the retail store 106. The card ID and the PIN number are forwarded from the retail store 106 to the fund distribution service 108. The fund distribution service 108 verifies that the forwarded card ID and the PIN number matches the card ID and the PIN number stored at the fund distribution service 108, authorizes the retail store 106 purchase, reduces the card's 702 balance by the purchase amount, and optionally deducts the purchase amount from the event coordinator's funds in bank 110. In one embodiment, the fund distribution service 108 also verifies that the event associated with the card 702 represents an event that is still open.

Figure 2:
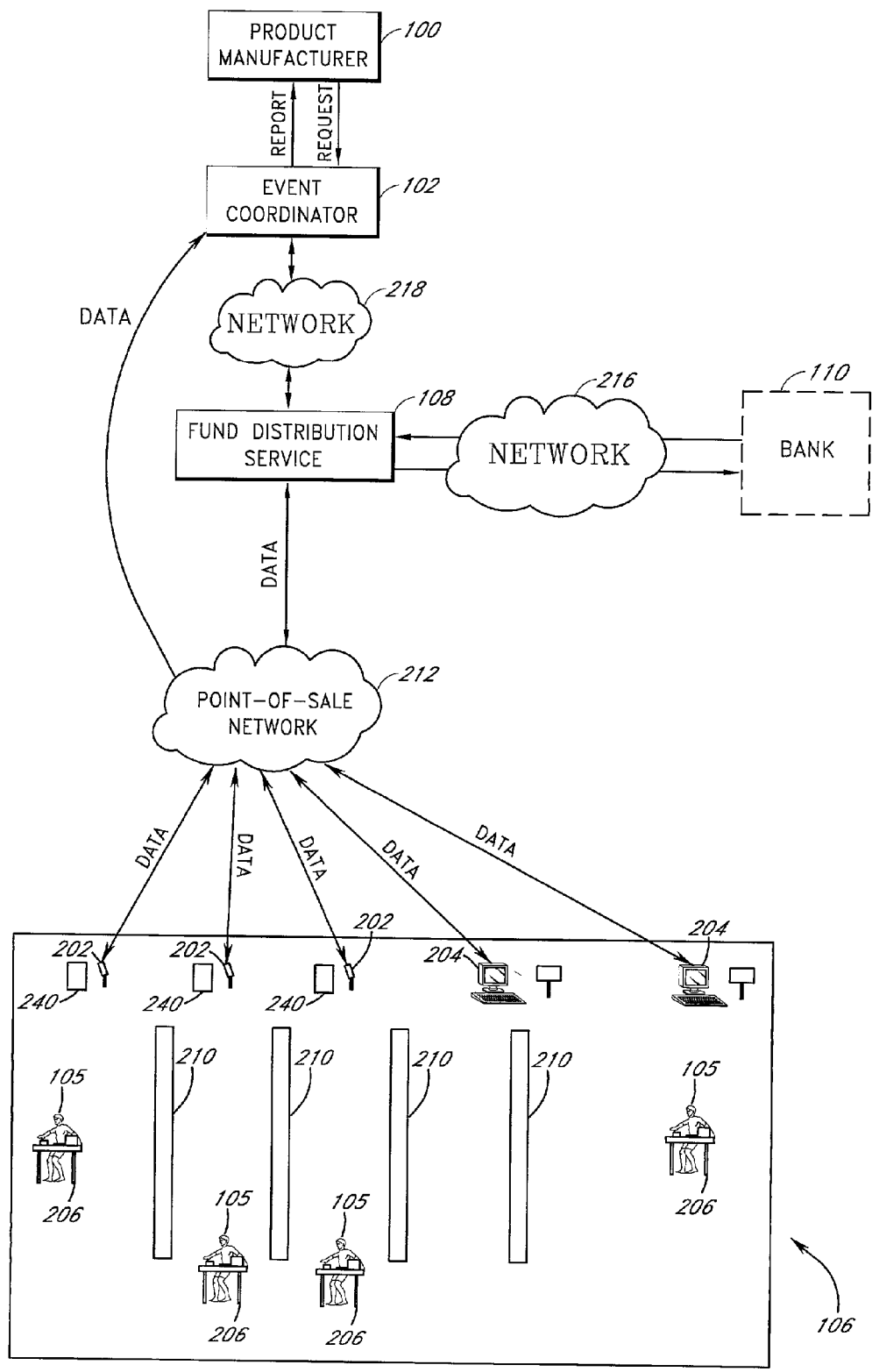
FIG. 2 is a block diagram of the functional elements of the system for coordinating product and service demonstrations.

FIG. 2 is a block diagram of the functional elements of the system for coordinating product and service demonstrations. The retail store 106 includes a plurality of event operators 105 shown at a plurality of demonstrations 206, a plurality of cash registers 240, a plurality of card reading devices 202, a plurality of time recording devices 204, and a plurality of aisles 210. The card reading devices 202 and the cash registers 240 are preferably located in close proximity at checkout lanes of the retail store 106. Each of the event operators 105 may be any individual or group of individuals that assist with the demonstration of a good or service.

The product manufacturer 100 issues a request to the event coordinator 102 to conduct a product demonstration event. The event coordinator 102 requests and receives cards 702 from the fund distribution service 108 to be used to purchase items for conducting the event. The event coordinator 102 also identifies to the fund distribution service 108 an account at a bank 110 from which the event coordinator's funds will be used to support the purchases. The cards 702 are assigned to the event operators 105 to be used as described below.

When an event operator 105 enters the retail store 106, the event operator 105 swipes or inserts a card 702 at the time recording device 204 to record his or her work starting time. The time recording device 204 records the time and sends the time entry data and the card ID to the point-of-sale network 212. Optionally, the time recording device 204 can be a kiosk, wireless device, PDA, cellular phone, or any other device capable of recording time entries. In one embodiment, the card reading device 202 also functions as a time recording device 204 to record time entries. The point-of-sale network 212 is preferably a Public Switched Telephone Network (PSTN). One skilled in the art will recognize that the point-of-sale network 212 can also be the Internet, a cable television (CATV) network, a satellite network, or any other communications network. When the event operator 105 has completed the demonstration and is ready to exit the retail store 106, he or she swipes or inserts the card 702 at the time recording device 204 to record his or her work ending time. The point-of-sale network 212 sends the time entry data to the event coordinator 102. Optionally, the identity or location of the retail store 106 is also sent to the event coordinator 102, so that the event coordinator 102 can verify that the event operator 105 went to the specified retail store 106. The point-of-sale network 212 sends data to the event coordinator 102 through the fund distribution service 108 and the network 218. The network 218 is preferably a Public Switched Telephone Network (PSTN). One skilled in the art will recognize that the network 218 can also be the Internet, a cable television (CATV) network, a satellite network, or any other communications network. In another embodiment, the point-of-sale network 212 sends data directly to the event coordinator 102.

After recording his or her work starting time, the event operator 105 then purchases the items needed for the product or service demonstration by searching through the aisles 210 of the retail store 106. The event operator 105 takes the items to the cash register 240 and purchases the items by swiping or inserting the card 702 at the card reading device 202. In one embodiment in which the card reading device 202 can function as a time recording device 204, the event operator 105 records work starting time by swiping or inserting the card 702 at the card reading device 202 at the cash register 240 at the same time as purchasing an item or before the purchase of an item.

In one embodiment, the event operator 105 purchases items at an automated cash register 240, without the help of a store employee. The event operator 105 swipes or inserts the card 702 at the card reading device 202. The automated cash register 240 then authorizes the purchase.

When the event operator 105 purchases the items by swiping or inserting the card 702, data received by the card reading device 202 is sent from the point-of-sale network 212 to the fund distribution service 108, which determines if the purchase amount falls within the balance of the card 702. If the purchase amount falls within the balance, the purchase is authorized and the purchase amount is deducted from the balance on the card 702. In one embodiment, the identities of the items to be purchased are also sent to the fund distribution service 108. The identity of an item can include an item identifier such as an UPC (Uniform Product Code) code, or an item name. The identities of the items are compared against a list of authorized items for the event associated with the card 702, to ensure that the event operator 105 purchased the authorized items, instead of other items for personal use. In one embodiment, the identities of authorized items are stored on the card 702. A smart card is preferably used to store the identities of authorized items. Other information, such as the location or identity of the retail store 106, can also be sent to the fund distribution service 108 to ensure that the event operator 105 is at the correct location. After the event operator 105 completes the purchase, the event operator 105 conducts the demonstration 206 using the purchase items. If the purchase amount exceeds the balance, the purchase will be rejected.

The point-of-sale network 212 sends the time entry data and the purchase data of the event operators 105 from the retail store 106 to the fund distribution service 108. The fund distribution service 108 then uses the network 216 to issue a request to the bank 110 to transfer the purchase amounts from the funds of the event coordinator 102 to an account of the retail store 106. In another embodiment, the point-of-sale network 212 directly sends the purchase data of the event operators 105 to the bank 110. The bank 110 optionally verifies that the purchase data received directly from the point-of-sale network 212 matches the purchase data received from the fund distribution service 108. The bank 110 transfers the purchase amounts from the funds of the event coordinator 102 to an account of the retail store 106.

After completing the demonstration, the event operator 105 proceeds to the time recording device 204 and swipes or inserts the card 702 to record his or her work ending time. The total working time of the event operator 105 is determined by deducting the recorded ending time from the recorded starting time. The recorded work starting time, the recorded work ending time and the total working time are sent from the point-of-sale network 212 to the fund distribution service 108. The fund distribution service 108 sends the time entry data and the purchase data to the event coordinator 102. In another embodiment, the time entry data and the purchase data are sent directly from the point-of-sale network 212 to the event coordinator 102.

The event coordinator 102 uses the received data to evaluate the work performance of event operators 105. Based on the evaluation, the event coordinator provides further instructions to the agency 104 or to the event operators 105. The event coordinator 102 uses the purchase data to determine if the event operators 105 are making the proper purchases. The event coordinator 102 sends a report of demonstration performance to the product manufacturer 100. The event coordinator 102 can also send the time entry data and the purchase data to the product manufacturer 100. In one embodiment, based on the report received from the event coordinator 102, the data received from the event coordinator 102, or both the report and the data, the product manufacturer 100 determines the amount of compensation to be paid to the event coordinator 102. For example, the amount of compensation can be the total purchase amount on authorized purchases plus a fixed percentage. The amount of compensation can be adjusted based on the time entry data and the purchase data. For example, the amount of compensation can be adjusted based on the time duration of demonstrations, the number of demonstrations conducted on a certain date, the number of demonstrations conducted on a certain product, the number of demonstrations conducted at a certain location, and so forth. The event coordinator 102 uses the time entry data and the purchase data, the report, and feedback from the product manufacturer 100 to adjust future work assignments. For example, the event coordinator 102 may decide to use more event operators 105 in a certain area or on a certain product.

In one embodiment, the card 702 employs smart card technology. The card 702 includes an imbedded computer chip, and the card reading device 202 is a smart card reader. The event ID, the card ID, and the PIN number can be stored on the card 702. In addition, the authorized budget and the authorized items for the event can be stored on the card 702. Multiple event IDs for multiple events, the respective authorized budgets for the events, and the respective authorized items for the events, can also be stored on the card 702. By entering an event ID at the card reading device 202, the event operator 105 can select an event to be associated with the card 702. In another embodiment, the event operator 105 contacts a card administration system and selects an event to be associated with the card 702.

Figure 3:
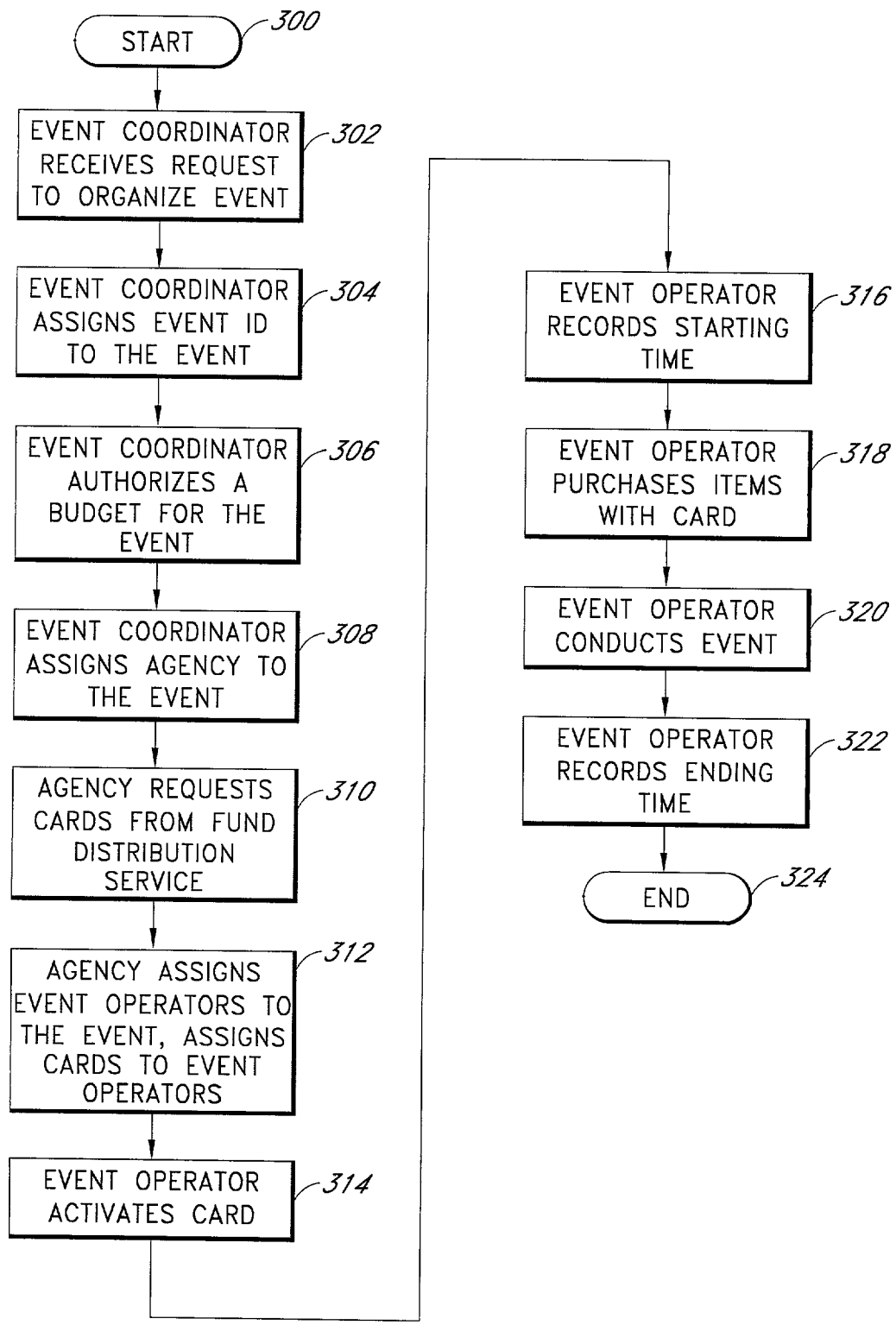
FIG. 3 is a flow chart illustrating one embodiment of a process of distributing cards to event operators and conducting demonstrations.

FIG. 3 is a flow chart illustrating one embodiment of a process for distributing cards 702 to event operators 105 and for conducting demonstrations. The process begins at a block 300. The process advances from the block 300 to a block 302, where the event coordinator 102 receives a request from the product manufacturer 100 to organize a demonstration event at the retail store 106. The process then advances to a block 304, where the event coordinator 102 assigns an event ID for the given demonstration event. An event can be defined as activities in a single day, or a number of days. An event can be defined as demonstrations on a particular product, or on a number of products. An event can also be defined as demonstrations of a particular service, or a number of services.

The process advances from the block 304 to a block 306, where the event coordinator 102 authorizes a budget for use by each event operator 105 in purchasing items for the demonstration event. The budget is associated with the event ID. The process then advances to a block 308, where the event coordinator 102 assigns an agency 104 or a number of agencies to organize the event. In another embodiment, the event coordinator 102 directly assigns event operators 105 to conduct the event.

The process then advances to a block 310, where the assigned agency 104 requests cards 702 from the fund distribution service 108. In one embodiment, the event coordinator 105 requests cards 702 from the fund distribution service 108. In one embodiment, the agency 104 or the event coordinator 102 has retained cards 702 previously provided by the fund distribution service 108, and redistributes the cards 702 to the event operators 105 for the current demonstration event.

The process advances to a block 312, where the agency 104 assigns event operators 105 to the event, and assigns cards 702 to the assigned event operators 105. In one embodiment, the event coordinator 102 assigns cards 702 to the event operators 105 to conduct the event.

The process then advances to a block 314, where an event operator 105 activates the card 702 prior to a demonstration. In one embodiment, the event operator 105 activates the card 702 by entering the event ID into the card reading device 212 at the time of purchase. One embodiment of the activation process is described below in connection with FIG. 4. Optionally, the event operator 105 can activate the card 702 by calling a toll-free phone number or by accessing an activation web site. The process then advances to a block 316, where the event operator 105 swipes or inserts his or her card 702 at a time recording device 204 to record his or her work starting time.

The process then advances to a block 318, where the event operator 105 uses the card 702 to purchase items needed for the demonstration. The process then advances to a block 320 where the event operator 105 performs the demonstration. The term "demonstration" is used broadly in the present application to refer to the display, distribution, promotion, or advertising of products and services. The process then advances to a block 322, where the event operator 105 records his or her work ending time at a time recording device 204. The process then proceeds to an end block 324.

Figure 4:
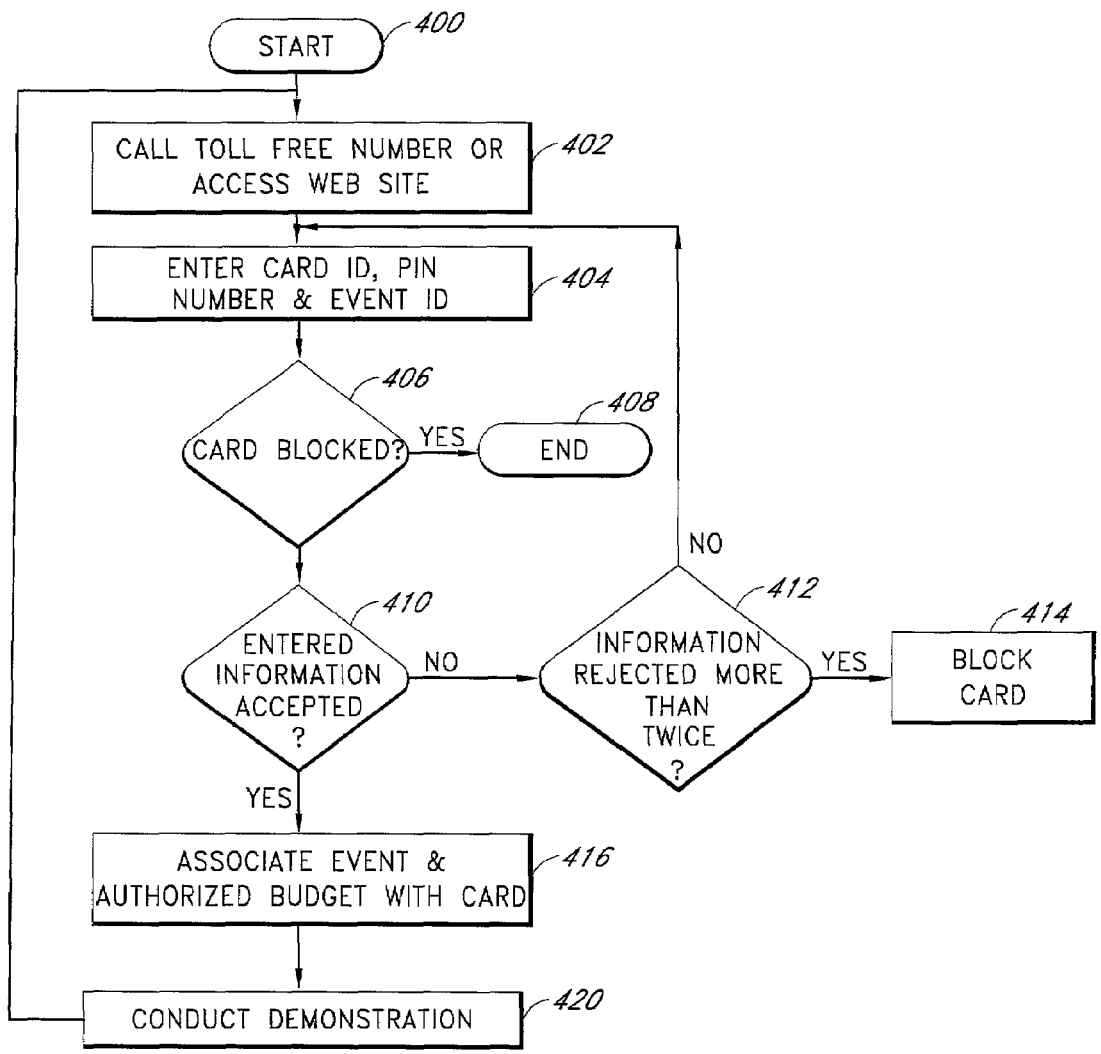
FIG. 4 is a flow chart illustrating one embodiment of the process of an event operator activating a card.

FIG. 4 is a flow chart illustrating one embodiment of the process of an event operator 105 activating a card 702. The process begins at a block 400. The process advances to a block 402, where the event operator 105 contacts a card administration system by calling a phone number, preferably a toll-free number, to activate the card 702. In another embodiment, the event operator 105 contacts the card administration system by accessing an activation web site. The process then advances to a block 404, where the event operator 105 enters information such as the card ID of the card 702, the PIN number of the card 702, and the event ID for the particular demonstration event. In one embodiment, the PIN number is the last four digits of the card ID. In another embodiment in which a card 702 is not associated with a PIN number, the event operator 105 enters the card ID and the event ID. The process advances to a decision block 406, where the card administration system determines whether the card 702 associated with the entered card ID has been blocked. In one embodiment to be described below, the card administration system updates a card's 702 status to "blocked" if a user has attempted unsuccessfully more than twice to activate the card. The card administration system also updates a card's 702 status to "blocked" if the card has been reported stolen, or if the event operator 105 or the agency 104 in possession of the card 702 has been terminated by the event coordinator 102. If the card 702 has been blocked, the process advances to an end block 408, and the event operator 105 cannot use the card 702. To "un-block" a card, a system administrator of the card administration system updates the status of the card. If the card 702 has not been blocked, the process advances to a decision block 410.

At the decision block 410, the information entered in block 404 is either accepted or rejected. The card administration system verifies that the entered card ID, the entered PIN number and the entered event ID are valid. One embodiment of the card administration verification process is described below in connection with FIG. 5. If the information is not valid and is thus rejected, the process advances to a decision block 412 to determine if the information has been rejected more than two times.

At the decision block 412, if the information has not been rejected more than two times, the process returns to the block 404 to allow the event operator 105 to re-enter the card ID, the PIN number, or the event ID. At the decision block 412, if the information has been rejected more than two times, there is a presumption that the information was rejected for a reason other than a mistaken entry, and the card is blocked at a block 414. The card administration system updates the card's status to a blocked status, so that the card can no longer be used by an event operator 105. In one embodiment, the number of rejections allowed is a variable that can be modified by the event coordinator 102 or the fund distribution service 108.

If the information is accepted at the decision block 410, the process advances to a block 416, where the card 702 is associated with an authorized budget for an event. The card administration system identifies the authorized budget for the provided event ID, and associates the budget with the card 702. The balance of the card 702 is updated to the amount of the budget. To help the event coordinator 102 track the current use of the card 702, the card administration system also associates the event with the card 702. The process then advances to a block 420, where the event operator 105 uses the card 702 to make purchases and conducts demonstration. The card administration system then deactivates the card 702 at a later time, for example at the end of the last day of the demonstration event. In particular embodiments, each event operator 105 is instructed to contact the card administration system after completing his or her demonstration to deactivate the card 702, by providing the card ID, PIN number, and an event ID for the event to be deactivated. The card administration system reduces the balance of the card 702 to zero, thus preventing an event operator 105 from using the card 702 to make purchases for a deactivated event. The process then returns to the block 402 to allow the event operator 105 to activate the card 702 for a subsequent demonstration.

In another embodiment, the event coordinator 102 or the agency 104 provides pre-activated cards 702 to the event operators 105. Each of the cards 702 is already associated an authorized budget and optionally with an event ID. The event coordinator 102 or the agency 104 activates the cards 702 by contacting the card administration system using the process of FIG. 4, or by updating the card records in the card administration system using a system administrator's program. Therefore the event operators 105 do not need to activate the cards 702.

In one embodiment, the card administration system is administered by the event coordinator 102. Data on activated cards 702, including the card ID, the PIN number, and the card balance are sent to the fund distribution service 108, which uses the data to authorize or reject event operator 105 purchases.

Figure 5:
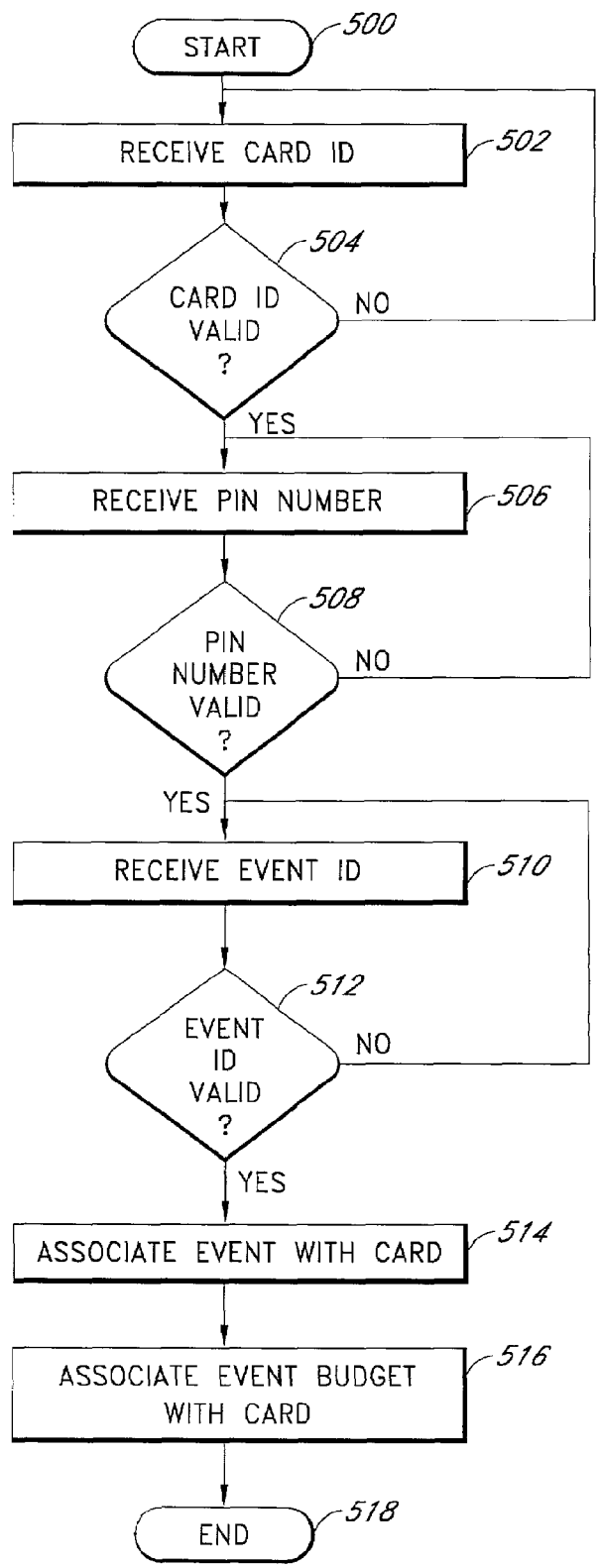
FIG. 5 is a flowchart illustrating one embodiment of the process of a card administration system activating a card.

FIG. 5 is a flowchart illustrating one embodiment of the process of a card administration system activating a card 702. The card administration system stores records for events, including the respective event ID, authorized budget, and status for each event. The card administration system also stores records for cards 702, including the respective card ID, the PIN number, the status, the associated event ID, and the balance for each card. In one embodiment, a card record also includes an identifier of the agency 104 to which the card 702 is assigned, or an identifier of the event operator 105 to which the card 702 is assigned.

The process starts from a start block 500, and advances to a block 502. At the block 502, the card administration system receives a card ID provided by an event operator 105. The process advances to a decision block 504, where the card administration system verifies that the provided card ID is valid. The card administration system verifies that the card ID is associated with an existing card 702, and that the card 702 is not blocked or already activated. If the card ID is not valid, the process returns to the block 502 to prompt the event operator 105 to re-enter the card ID. If the card ID is valid, then the process advances to a block 506.

At the block 506, the card administration system receives a PIN number from the event operator 105. The process advances to a decision block 508, where the card administration system verifies that the provided PIN number is valid. The card administration system verifies that the PIN number is associated with the card 702. If the PIN number is not valid, the process returns to the block 506 to prompt the event operator 105 to re-enter the PIN number. If the PIN number is valid, then the process advances to a block 510. In one embodiment, a card 702 is not associated with a PIN number, and the actions of the block 506 and the block 508 are omitted.

At the block 510, the card administration system receives an event ID from the event operator 105. The process advances to a decision block 512, where the card administration system verifies that the provided event ID is valid. The card administration system verifies that the event ID is associated with an existing event that is still open. The card administration system maintains the events and the respective "open" or "closed" status for each event. If the event coordinator 102 does not want to have demonstrations conducted for an event, the event coordinator 102 directs the event status to be defined as "closed." In one embodiment, the card administration system maintains a starting date and an ending date of each event. If the ending date for an event has expired, the event is automatically defined as a closed event, so that event operators 105 cannot use cards 702 for an event that has passed its scheduled ending date. An event having a starting date more than one day later than the current date is also defined as a closed event, so that event operators 105 can use cards 702 only for events scheduled to start on the current day or the next day, but cannot use cards 702 for events scheduled to start on a later future date.

If the event ID is not valid, the process returns from the decision block 512 to the block 510 to prompt the event operator 105 to enter a valid event ID. If the event ID is valid, the process advances to a block 514. At the block 514, the card administration system associates the event ID with the card 702. The process advances to a block 516, where the card administration system associates the authorized budget of the event with the card 702. The balance of the card 702 is updated to be the amount of the authorized budget of the event. In another embodiment, the card administration system increases the balance of the card 702 by the amount of the authorized budget of the event. The process then advances to an end block 518.

In one embodiment, each demonstration event is defined as an event starting and ending on a particular day. At the end of the day, the card administration system assigns an event status of "closed" to all events of the current day, and deactivates all cards 702 associated with such events. The balance of a deactivated card 702 is reduced to zero.

Figure 6:
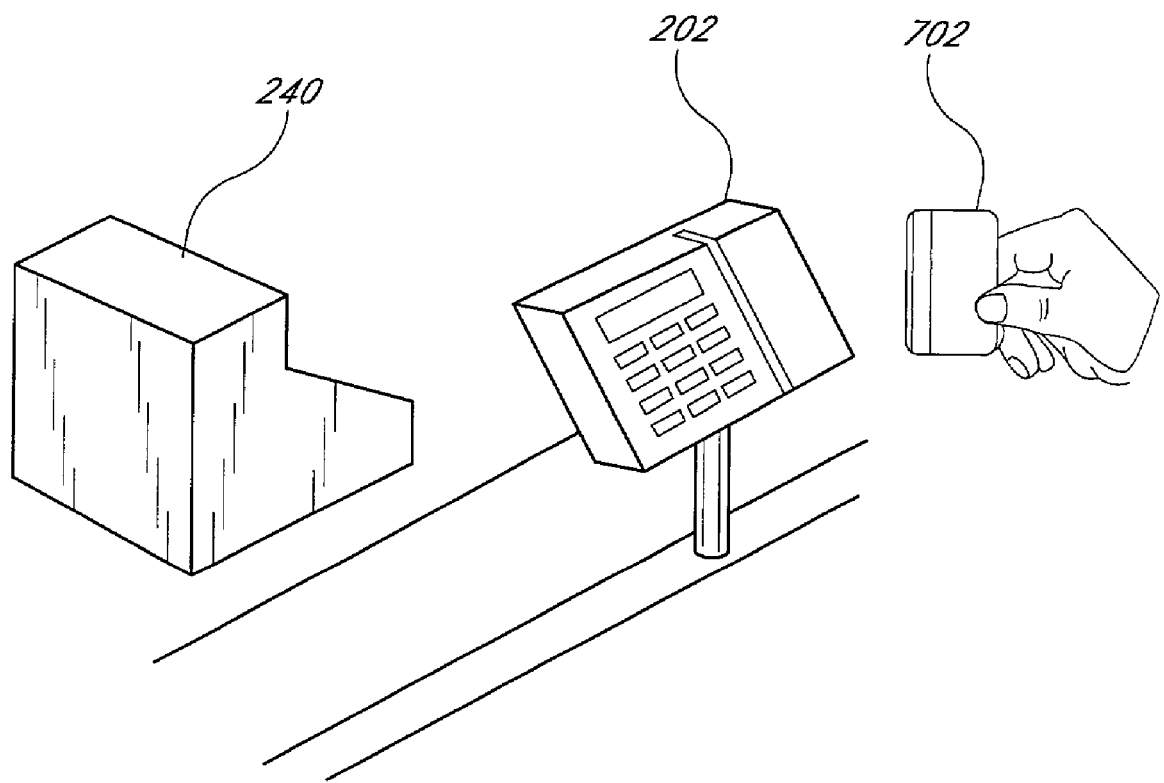
FIG. 6 is a diagram illustrating one embodiment of a card reading device and a cash register.

FIG. 6 illustrates one embodiment of the card reading device 202 placed near the cash register 240 within the retail store 106. The configuration allows for the event operator 105 to use the card 702 by swiping or inserting it at the card reading device 202. One embodiment of the card reading device 202 is Master Card's Maestro card reading device.

Figure 7:
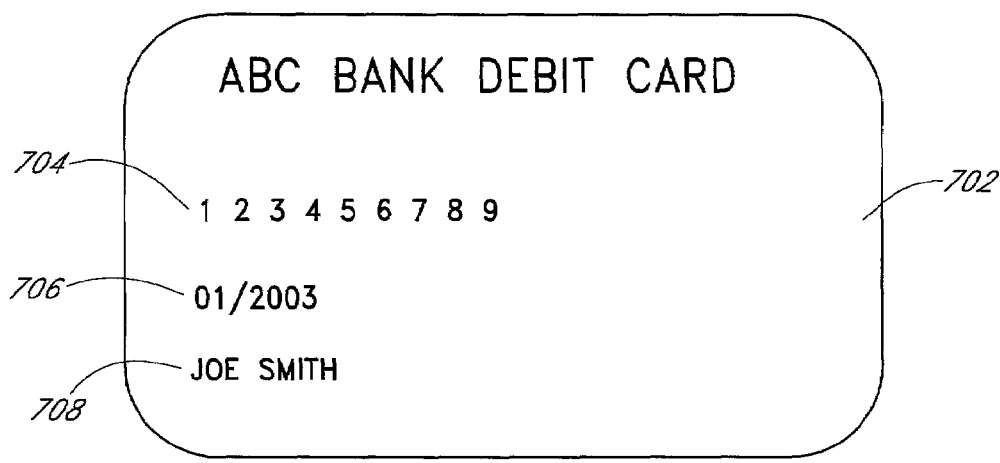
FIG. 7 illustrates one embodiment of a card.
Figure 7:
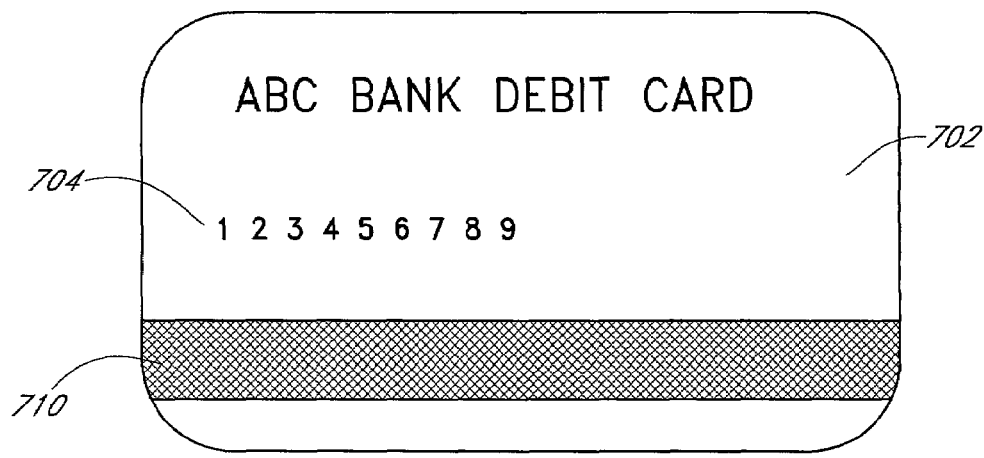

FIG. 7 illustrates one embodiment of a card 702. The top portion of FIG. 7 illustrates the front of a debit card issued by "ABC BANK." The bottom portion of FIG. 7 illustrates the back of the debit card. The card 702 as shown in FIG. 7 includes a card number 704, an expiration date 706, and a customer name 708. The customer name 708 is typically the name of the event coordinator 102, but can also be the name of the agency 104 or the name of an event operator 105. The card 702 also includes a magnetic strip 710, which stores card information such as the card number 704. In another embodiment, the card 702 does not include a customer name 708.

Figure 8:
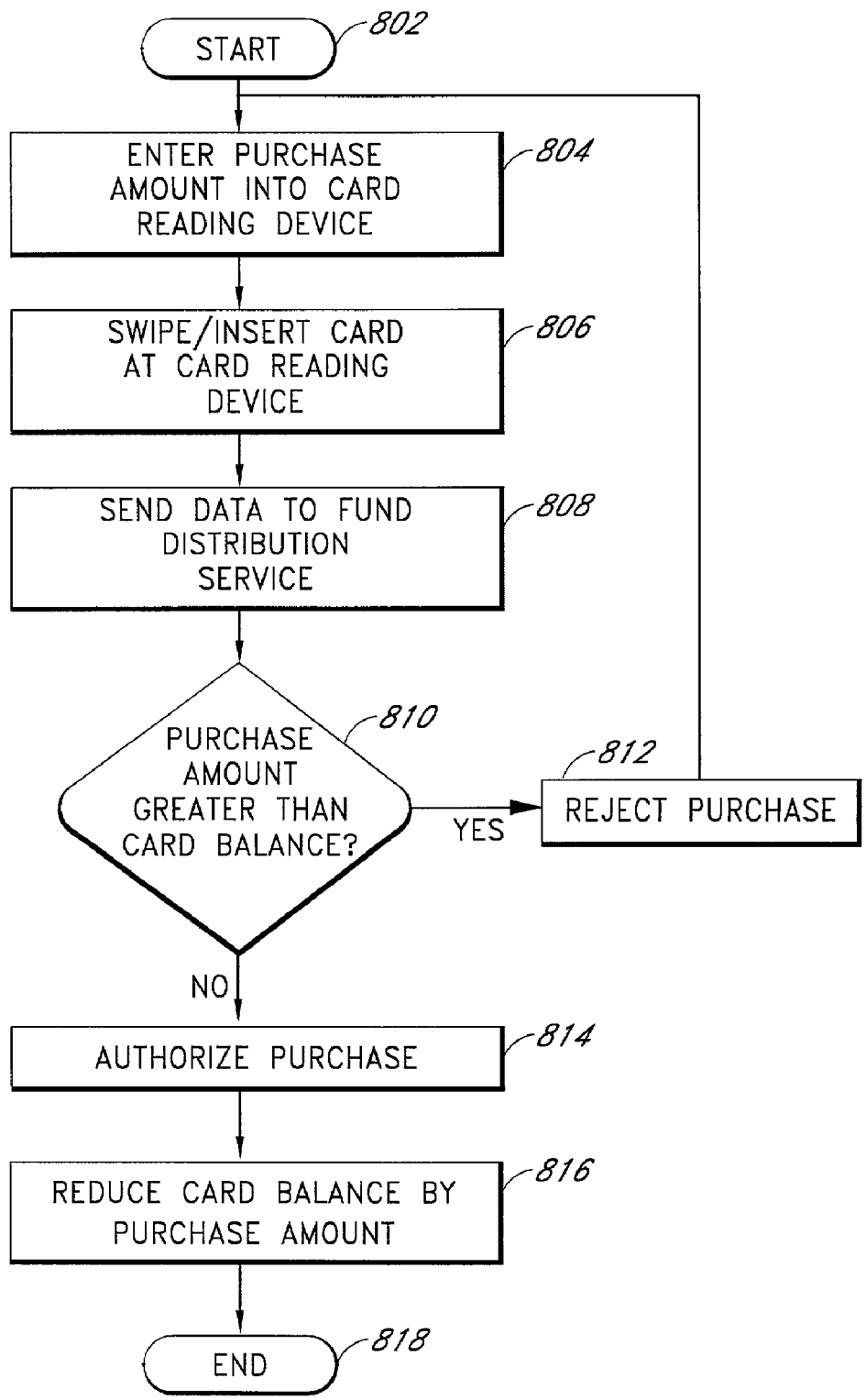
FIG. 8 illustrates one embodiment of a card purchase authorization process.

FIG. 8 illustrates one embodiment of a card purchase authorization process. The process starts from a block 802 and advances to a block 804. At the block 804, the event operator 105 or a retail store 106 employee enters the total purchase amount for the items to be purchased into a card reading device 202. In one embodiment, the event operator 105 or a retail store 106 employee scans the total purchase amount into the card reading device 202. The process advances to a block 806, where the event operator 105 or the retail store 106 employee swipes or inserts the card 702 at the card reading device 202. In one embodiment, the event operator 105 further enters a card PIN number into the card reading device 202. The process advances to a block 808, where the card reading device 202 sends data through the point-of-sale network 212 to the fund distribution service 108. The sent data includes the total purchase amount, the card ID of the card 702, and optionally other information, such as the identifications of the items to be purchased, the current date and time, and the identification of the retail store 106. In one embodiment, the card reading device 202 sends data to a card administration system maintained by the fund distribution service 108, by the event coordinator 102, or jointly by the fund distribution service 108 and the event coordinator 102. In another embodiment, a card information database at the fund distribution service 108 is connected to a card administration system of the event coordinator 102. When an event operator 105 contacts the card administration system and activates a card 702, the card administration system updates the card balance in the card administration system, and notifies the fund distribution service's card information database to update the card balance.

The process advances from the block 808 to a decision block 810, where a determination is made as to whether the requested purchase amount is greater than the card balance. If the purchase amount is greater than the card balance, the process advances to a block 812, where the authorization request is rejected. The process then returns from the block 812 to the block 804, where the event operator 105 or the retail store 106 employee can enter another purchase amount. If the purchase amount is less than or equal to the card balance, then the process advances from the decision block 810 to a block 814, where the purchase is authorized. The event operator 105 is thus allowed to purchase the items for conducting a demonstration event. The process advances to a block 816, where the card balance is reduced by the purchase amount. In one embodiment in which the fund distribution service's card information database is connected to the event coordinator's card administration system, the fund distribution service reduces the card balance in the card information database, and notifies the card administration system to reduce the card balance in the card administration system. The process then advances to an end block 818.

FIG. 9 illustrates one embodiment of a computer screen for maintaining event records in a card administration system. An event records table 902 in FIG. 9 displays event records stored in the card administration system. Each event record includes an event ID 904 that identifies the event, an event status 906 of "open" or "closed," an event starting date 908, an event ending date 910, an authorized budget 912 of the event, an agency ID 914 identifying the agency (or agencies) responsible for the event, and card numbers 916 identifying cards that are associated with the event. Event operator identifiers (not shown) can also be associated with an event record, to identify event operators 105 who are responsible for conducting the event. The event operator identifiers can be entered by the event operators 105 when they contact the card administration system to activate the cards 702.

The event records are preferably maintained by the event coordinator 102. The event coordinator 102 creates and updates the event records. The event coordinator 102 assigns an authorized budget 912 to each event. The event coordinator 102 also assigns one or more agencies 104 identified by the agency ID field 914 to conduct the event. The event status 906 can be maintained by a system administrator of the event coordinator 102, or maintained automatically depending on the event starting date 908 and the event ending date 910. For example, an event whose event ending date 910 has expired (i.e., is earlier than the current date) is assigned an event status 906 of "closed." An event whose event starting date 908 has not arrived (i.e., is much later than the current date) is also assigned an event status 906 of "closed."

The event records can be maintained in a spreadsheet, a flat file database, a relational database, an object-oriented database, or a combination of the above. An event record can be maintained in separate tables. For example, the event ID 904 and the authorized budget 912 can be maintained in an event-budget table, and other event information shown in table 902 except the authorized budget 912 can be maintained in a separate table. For another example, instead of being stored in the event records table 902, the card numbers 916 can be stored in a card records table 1002 (see FIG. 10). As described below, the card administration system can use the event ID 1014 in the card records table 1004 to identify the card IDs associated with each event. The event ID 1014 of a card record stores the event ID associated with the card 702. The card numbers 916 are then displayed in the event records table 902.

FIG. 10 illustrates one embodiment of a computer screen for maintaining card records in a card administration system. A card records table 1002 in FIG. 10 displays card records stored in the card administration system. Each card record includes a card ID 1004, a PIN number 1006, a card status 1008 of "activated," "deactivated," or "blocked," a balance amount 1010, an agency ID 1012 identifying the agency to which the card 702 is assigned, and an event ID 1014 identifying the event associated with the card 702. A card record can also include an event operator identifier (not shown) that identifies the event operator 105 to whom the card 702 is assigned. The event operator identifiers can be entered by the event operators 105 when they contact the card administration system to activate the cards 702.

The card ID 1004 of a card 702 is typically issued by the fund distribution service 108. The event coordinator 102 assigns cards 702 to agencies 104, and updates the agency ID field 1012. The event coordinator 102 or the fund distribution service 108 can optionally update the PIN number 1006 of a card 702. In one embodiment, each agency 104 is assigned one or more fixed PIN numbers, to help the agency 104 and its event operators 105 to remember the PIN numbers. The event ID 1014 identifies the event associated with the card 702. The event ID 1014 is entered by an event operator 105 during the card activation process of FIG. 4. The balance amount 1010 is zero for deactivated or blocked cards 702. For cards 702 that have been activated but have not been used for purchases, the balance amount 1010 is equal to the authorized budget of the associated event. The balance amount 1010 of an activated card 702 is then reduced by the amount of purchase made by the event operator 105.

The card records can be maintained in a spreadsheet, a flat file database, a relational database, an object-oriented database, or a combination of the above. A card record can be maintained in separate tables. Other tables can also be used. For example, an agency records table (not shown) can be used to keep track of the cards 702 and the events assigned to each agency 104. The agency record table includes the agency ID, the card numbers for cards assigned to the agency 104, the event IDs for events assigned to the agency, and the PIN numbers assigned to the agency 104.

Additional information can also be displayed in computer-generated reports or computer screens. For example, for each card 702, a report or screen can display the item identifiers for the items purchased using the card 702. Other purchase information can also be displayed, for example the item names for the purchased items, the price and quantity of the purchase items, the date and time of the purchase, the recorded work starting time, the work ending time, and the identity or location of the retail store 106. Computer-generated reports or computer screens can be used for many purposes, such as tracking the progress of a card 702, tracking the progress of an event, tracking the progress of an agency 104, and the like.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of coordinating the staffing of a product or service demonstration, comprising:
   creating records for a plurality of cards in a computer-readable medium in communication with a card administration module, the created card records comprising a card identifier and a validity state for each of the plurality of cards;
   creating a record for a demonstration event in the computer-readable medium, the created event record comprising an event identifier and a validity state for the event;
   receiving, using an automated device in communication with the computer-readable medium, an activation request from a candidate event operator requesting to work on the demonstration event, the activation request comprising a card identifier of a requesting card associated with the candidate event operator and an event identifier for the requested demonstration event;
   retrieving, based on the activation request, records associated with the card identifier and the event identifier;
   verifying, using the card administration module, the validity state of the requesting card and the requested event based on the retrieved card identifier and event identifier;
   activating the requesting card in response to verifying that the validity state of the requesting card is not invalid and that the validity state of the requested event is not invalid, and updating the event record for the requested event to associate the activated card with the requested event, wherein the updating is performed by the card administration module; and
   recording in the computer-readable medium time and attendance information for the event operator derived from purchasing information received from a first purchase using the activated card in a card-reading system and a later second purchase using the activated card.

2. The method of claim 1, further comprising creating a record in the computer-readable medium comprising an indicator that the demonstration event is a product demonstration event.

3. The method of claim 1, further comprising creating a record in the computer-readable medium comprising an indicator that the demonstration event is a service demonstration event.

4. The method of claim 1, further comprising:
   receiving, using the automated device, a second activation request from a second candidate event operator requesting to work on the demonstration event, the activation request comprising a card identifier of a second requesting card associated with the second candidate event operator and an event identifier for the requested demonstration event;
   rejecting the second activation request in response to determining, using the card administration module, that the second requesting card has a blocked status.

5. The method of claim 1, further comprising: receiving, using the automated device, a second activation request from a second candidate event operator requesting to work on the demonstration event, the activation request comprising a card identifier of a second requesting card associated with the second candidate event operator and an event identifier for the requested demonstration event;
   rejecting the second activation request in response to determining, using the card administration module, that the requested event has a closed status.

6. The method of claim 1, further comprising using the card administration module to compare the timing of one or both of the first purchase and the second purchase with a scheduled time for the demonstration even, the scheduled time being stored in the record for the requested demonstration event.

7. The method of claim 1, further comprising using the card administration module to compare the location of one or both of the first purchase and the second purchase with a scheduled location associated with the requested demonstration event, the scheduled location being stored in the record for demonstration event.

8. The method of claim 1, further comprising using the card administration module to compare one or more products purchased in one or both of the first purchase and the second purchase with a scheduled product associated with the requested demonstration event, the scheduled location being stored in the record for demonstration event.

9. The method of claim 1, further comprising using the card administration module to determine a time duration between the time of the first purchase and the time of the second purchase.

10. The method of claim 9, further comprising using the card administration module to determine a compensation amount due the event operator derived from the determined time duration.

* * * * *

UNITED STATES PATENT AND TRADEMARK OFFICE
CERTIFICATE OF CORRECTION

| | |
|---|---|
| PATENT NO. | : 7,444,305 B2 |
| APPLICATION NO. | : 10/013826 |
| DATED | : October 28, 2008 |
| INVENTOR(S) | : Sandra Cotten and Caroline Nakken |

Page 1 of 1

It is certified that error appears in the above-identified patent and that said Letters Patent is hereby corrected as shown below:

On page 2, under the heading "U.S. Patent Documents," delete "Frazee" and insert --Kazaks et al.--.

At column 14, line 33 (in Claim 6), delete "even" and insert --event--.

Signed and Sealed this

Twenty-fourth Day of March, 2009

JOHN DOLL
*Acting Director of the United States Patent and Trademark Office*